United States Patent [19]
Ludwig

[11] 3,996,177
[45] Dec. 7, 1976

[54] STABLE ACRYLIC ESTER LATEX COATING COMPOSITIONS

[75] Inventor: Robert U. Ludwig, Lorain, Ohio

[73] Assignee: The B. F. Goodrich Company, Akron, Ohio

[22] Filed: Feb. 18, 1975

[21] Appl. No.: 550,369

[52] U.S. Cl. .................. 260/29.4 UA; 260/856
[51] Int. Cl.² ................................ C08L 61/20
[58] Field of Search .............. 260/29.4 UA, 856

[56] References Cited
UNITED STATES PATENTS 3,269,994   8/1966   Horn et al. .............. 260/29.4 UA Primary Examiner—J. Ziegler
Attorney, Agent, or Firm—Alan A. Csontos

[57] ABSTRACT

Acrylic ester polymers having reactive functional groups are admixed in latex form with a combination of a melamine-formaldehyde and a urea-formaldehyde thermoset resin to provide stable latex coating compositions. The compositions provide upon cure water and chemical resistant coatings for hardboard and other surfaces.

9 Claims, No Drawings

STABLE ACRYLIC ESTER LATEX COATING COMPOSITIONS

BACKGROUND OF THE INVENTION

The building trade and related industries consume many square feet annually of wood and metal materials which require protective coatings. One of the most used wood materials is hardboard which is made from ground or chipped wood fibers mixed with a suitable cohesive and pressed. The hardboard surface is coated to improve weather resistance, water and solvent resistance and hardness. Typically, the coating systems are solvent-based resin compositions. The use of such compositions required extra safety and health precautions to reduce solvent escape into the air. A water-based coating composition would be less toxic and less polluting.

In an attempt to prepare a good water-based (i.e. latex) coating composition, reactive acrylic ester latexes were mixed with thermoset resins. Unfortunately, the use of a urea-formaldehyde type thermoset resin did not yield coating compositions that provided adequate water resistance after cure. The use of melamine-formaldehyde thermoset resins in the latices yielded coating compositions that provided improved water-resistant coatings, but the latex composition was not stable, often gelling within one day. It was unexpectedly found that the use of a combination of a urea-formaldehyde and a melamine-formaldehyde thermoset resin in a reactive acrylic ester polymer latex yields stable latex coating compositions that provide, upon cure, improved water and chemical resistant coatings.

SUMMARY OF THE INVENTION

Stable acrylic ester polymer latex coating compositions for hardboard are presented. The compositions comprise an acrylic ester polymer latex wherein the polymer has hydroxyl and/or carboxyl groups thereon and a combination of a water-reducible urea-formaldehyde and melamine-formaldehyde thermoset resin. The compositions are stable on storage and upon cure yield coatings having improved resistance to water and chemicals.

DETAILED DESCRIPTION OF THE INVENTION

The latex coating compositions of the invention are stable admixtures of a reactive acrylic ester latex and a combination of a water reducible urea-formaldehyde and melamine-formaldehyde thermoset resin. An acid catalyst is normally employed to accelerate cure of the composition. An amine is used to raise the pH of the latex coating composition to above 7, and preferredly from about 8 to about 10. The reactive acrylic ester latex is used at a level of 100 parts by weight on a dry weight basis. The combination of the water-reducible urea-formaldehyde and melamine-formaldehyde thermoset resin is used at from about 5 parts to about 30 parts by weight per 100 parts by weight (dry weight) of the total weight of the latex polymer. More preferredly, the resin is used at about 15 to about 25 parts by weight per 100 parts of latex polymer. The acid catalyst (when employed) is used in from about 5 parts to about 15 parts by weight per 100 parts by weight total of the thermoset resin. The amine is added in amounts necessary to raise the pH of the composition to above 7.

The reactive acrylic ester polymer is the major ingredient in the composition. The acrylic ester polymer is an interpolymer of from about 9% to about 99% by weight of an acrylic ester monomer(s), up to about 90% by weight of a comonomer(s), and from about 1% to about 10% by weight of a reactive cure-site monomer(s). More preferredly, the polymer is an interpolymer of interpolymerized units of from about 9% to about 80% by weight of an acrylic ester, from about 10% to about 90% by weight of a comonomer, and from about 1% to about 10% by weight total of a reactive cure-site monomer(s). The polymer can be prepared using emulsion polymerization processes known to those skilled in the art. A particularly good process is a low soap emulsion polymerization process such as that disclosed in U.S. Pat. No. 3,457,209 which is hereby incorporated by reference. The polymer latex from this process has a particle size of from about 1000 A to about 3000 A.

The acrylic ester polymer is comprised of about 9% to about 99% by weight of interpolymerized units of at least one acrylic ester monomer of the formula

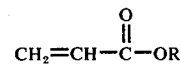

wherein R is an alkyl group containing from 1 to about 18 carbon atoms, an alkoxyalkyl or alkylthioalkyl group containing from 2 to about 8 carbon atoms in the group, or a cyanoalkyl group containing 2 to about 8 carbon atoms in the group. The carbon structure in the alkyl groups can be linear or branched; i.e. can contain primary, secondary, or tertiary carbon configurations. Examples of such monomers are methyl acrylate, ethyl acrylate, n-butyl acrylate, isobutyl acrylate, hexyl acrylate, octyl acrylate, 2-ethylhexyl acrylate, decyl acrylate, dodecyl acrylate, octadecyl acrylate, and the like; methoxyethyl acrylate, ethoxyethyl acrylate, and the like; and methylthioethyl acrylate, and the like; and α, β, and γ-cyanopropyl acrylate, and the like. Excellent results have been obtained using an acrylic ester monomer(s) wherein the R group is an alkyl group containing 1 to about 10 carbon atoms in the group.

Copolymerized with the acrylic ester monomer(s) can be one or more vinylidene comonomers containing a terminal ($CH_2$=C<) group. The comonomers are present as interpolymerized units in amounts of up to 90% by weight, and more preferredly, from about 10% to about 90% by weight. Examples of such comonomers are the meth- and ethacrylic esters such as methyl methacrylate, ethyl methacrylate, n-butyl methacrylate, methyl ethacrylate, and the like; vinyl halides such as vinyl chloride, vinyl and allyl esters such as vinyl acetate, vinyl butyrate, vinyl chloroacetate, and the like; and allyl acetate, methallyl propionate, and the like; vinyl aromatics such as styrene, vinyl toluene, chloromethyl styrene, vinyl naphthalene, and the like; vinyl nitriles such as acrylonitrile, methacrylonitrile, and the like. Preferredly, the weight and type of comonomer is used to produce an acrylic ester polymer having a glass transition temperature (Tg value) of 20° C. or more. Amounts of a given monomer necessary to obtain a Tg value are readily calculated using known formulas — see Nielsen, Mechanical Properties of Polymers, Reinhold Publishing Co., N.Y., N.Y., (1962), page 27. Excellent results have been obtained when vinyl chloride, methyl methacrylate, acrylonitrile, and/or styrene was used as the comonomer.

The reactive cure-site monomer is a carboxylcontaining vinylidene monomer or a hydroxyl-containing vinylidene monomer used alone or in combination with an acrylamide or carboxyl monomer. The hydroxyl-containing vinylidene monomer includes hydroxy-terminal acrylate monomers such as β-hydroxyethyl acrylate and methacrylate, α-hydroxypropyl acrylate, 4-hydroxybutyl acrylate, and the like; N-alkylol vinylidene amides, and hydroxymethyl derivatives of diacetone acrylamide of the formula

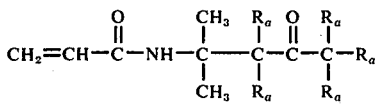

wherein $R_a$ is hydrogen or -$CH_2OH$ and the number of hydroxymethyl groups is at least one. Preferred are the N-alkylol amides of alpha, beta-olefinically unsaturated monocarboxylic acids containing 4 to 10 carbon atoms. Examples of such are N-methylol acrylamide, N-methylol methacrylamide, N-methylol maleamide, N-propanol acrylamide, N-methylol-p-vinyl benzamide, and the like. Most preferred because of their availability and cost are the N-alkylol amides of alpha, beta-monoolefinically unsaturated monocarboxylic acids such as N-methylol acrylamide, N-methylol methacrylamide, and the like.

The carboxyl-containing vinylidene monomer is an α,β-olefinically unsaturated carboxylic acid such as acrylic and methacrylic acid, itaconic acid, citraconic acid, maleic acid, allyl acetic acid, and the like. More preferredly, the carboxyl monomer is vinylidene monocarboxylic acid containing 3 to about 6 carbon atoms such as acrylic and methacrylic acid. The hydroxyl-containing vinylidene monomers are preferredly used in combination with an acrylamide monomer or a carboxyl monomer. The acrylamide monomer is acrylamide or methacrylamide.

The second major ingredient in the latex coating composition is a combination of a water-reducible urea-formaldehyde and melamine-formaldehyde thermoset resin. Examples of melamine-formaldehyde resin are the Cymel resins (sold by American Cyanamid Co.) such as the hexamethoxymethyl melamine resins, the Uformite resins (sold by Rohm and Haas), and the Resimene resins (sold by Monsanto Co.), and disclosed in Product Information Bulletin No. 1094A. Examples of urea-formaldehyde resins are the Beetle resins (sold by American Cyanamid Co.), the Permafresh resins (sold by Sun Chemical Co.), and the Rhonite resins (sold by Rohm and Haas Co.). Excellent results have been obtained using a combination of a Cymel and a Beetle resin. The melamine-formaldehyde resin and urea-formaldehyde resin can be used in a ratio of about 1/1 weight ratio to about 4/1 weight ratio but a combination of the two resins at about a 3/1 weight ratio of melamine-formaldehyde to urea-formaldehyde resin is preferred. The water reducible thermoset resins herein described are not water soluble resins such as the ethers of melamine-formaldehyde resins disclosed in U.S. Pat. No. 2,600,681.

The acid catalyst when employed can be an organic, inorganic or Lewis acid. The function of the acid is to accelerate the cure of the composition. Examples of the acids are phosphoric acid, boric acid, citric acid, oxalic acid, p-toluene sulfonic acid, zinc nitrate, and the like. Often the acids are used in the form of alkali metal or ammonium or amine salts of the acid. Preferredly, the acid is an organic acid such as oxalic acid and p-toluene sulfonic acid.

Bases are used to raise the pH of the latex to above 7. The bases used can be any basic compound known to the art, but, preferredly, are amines. Although any amine can be used, and the latex composition will still exhibit improved stability, the type of amine employed affects the overall stability of the latex coating composition. Lower alkyl and alkanol amines were found to raise the pH of the latex and provide excellent stable compositions. By lower alkyl and alkanol amines is meant di- and trialkyl or alkanol amines wherein the alkyl or alkanol group contains 1 to 4 carbon atoms. Examples of such amines are triethylamine, diethanolamine, dimethylethanolamine, dimethylaminomethyl propanol, and mono-, di-, and triisopropanolamine. Of the lower alkyl and alkanol di- and triamines, diisopropanol amine and triisopropanol amine were found to yield excellent results.

The water-based coating composition can be used to produce excellent clear protective coatings on hardboard. Many other compounding ingredients well known to those skilled in the art such as thickeners, coalescing aids, fillers and reinforcing agents, plasticizers and extenders, antioxidants and stabilizers, fungicides, and the like, can be employed. Of particular interest is the addition of up to 10 parts by weight (dry basis) of polyvinyl chloride polymer in latex form. The addition of the vinyl halide resin reduces gloss.

The ingredients of the coating composition (plus other desired compounding ingredients) are readily admixed using mixing kettles. The amines are added to the latex to raise the pH of the composition to above 7 and, preferredly, to about 8 to 10.

The coating composition is stable and has excellent flow characteristics, particularly in its ability to be roller coated, sprayed, and curtain coated. The films put down on the hardboard are cured by heating the substrate surface temperature to above 120° F., more preferredly, at about 160° F. to about 325° F. for about 1 minute (at 300° F.) to about 10 minutes or more at lower temperatures. The cured coating provides excellent protection against water, steam, and chemicals, and provides a smooth and aesthetic surface.

Although the latex coating composition is directed to use as a coating composition for hardboard, it can be readily and effectually used to provide protective and decorative coatings for all types of wood and metal surfaces. Furthermore, although the melamine-formaldehyde resin and urea-formaldehyde resin combination is specified for use with acrylic ester polymer latexes, the combination is useful in other latexes such as polyvinyl chloride polymer latices and vinyl acetate polymer latices.

The following examples are set forth to further illustrate the invention. Ingredients are given in parts by weight unless otherwise specified.

EXAMPLE I

Part A

Water-reducible thermoset resins such as melamine-formaldehyde resins can be added to acrylic ester latexes to produce improved water and chemical resistant coatings. However, once the melamine-formaldehyde (MF) resin is added to the reactive acrylic ester polymer latexes of this invention, the mix must be used within a day or two or the viscosity of the mix rises rapidly and the mix gels and cannot be used. The following experiments demonstrate this phenomenon.

The reactive acrylic ester polymer latex used had a total solids of about 50% by weight and contained a polymer of interpolymerized units of 75.5% by weight methyl methacrylate, 20% ethyl acrylate, 2.6% acrylamide, and 1.9% by weight of N-methylol acrylamide. Mixes were prepared using this latex and a melamine-formaldehyde resin (sold as Cymel 303 by the American Cyanamid Co.). Various amines were employed in adjusting the pH of the mixes. The stability of the mixes was determined by viscosity measurements using a Brookfield model LVF Viscometer at 6 rpm or 60 rpm (measurements taken at room temperature). The mixes exhibited substantial viscosity increases in one day. The recipes used (in dry parts by weight) follow:

|  | 1 | 2 | 3 | 4 | 5 | 6 |
|---|---|---|---|---|---|---|
| Latex | 80 | 80 | 80 | 80 | 80 | 80 |
| MF Resin | 20 | 20 | 20 | 20 | 20 | 20 |
| p-toluene Sulfonic Acid | 2 | 2 | 2 | — | — | — |
| Isopropyl Alcohol (ml.) | 10 | 11 | 6 | 8 | 8 | 8 |
| Butyl Cellosolve (ml.) | — | 5 | — | — | — | — |
| Triethylamine | X | X | X | X |  |  |
| Diethanolamine |  |  |  |  | X |  |
| Dimethylethanolamine |  |  |  |  |  | X |
| Viscosity, Centipoises |  |  |  |  |  |  |
| Original |  |  |  |  |  |  |
| 6 rpm | 1050 | 1350 | 1150 | 900 | 1700 | 1300 |
| 60 rpm | 320 | 420 | 500 | — | 630 | 460 |
| One Day |  |  |  |  |  |  |
| 6 rpm | 3750 | 2900 | 6000 | 4200 | 1700 | 2000 |
| 60 rpm | 1140 | 1000 | 2300 | — | 670 | 780 |
| Eleven Days |  |  |  |  |  |  |
| 6 rpm | — | — | — | — | heavy | heavy |
| 60 rpm | — | — | — | — | cream | cream |
| Thirteen Days |  |  |  |  |  |  |
| 6 rpm | — | — | — | heavy | — | — |
| 60 rpm | — | — | — | cream | — | — |

The mix were prepared as follows: Sample 1 – the latex was adjusted to a pH of 9 using triethylamine, the isopropyl alcohol and p-toluene sulfonic acid were mixed and the solution adjusted to a pH of 9 using triethylamine, the MF resin was then added to the alcohol/acid solution, and this mixture added to the latex. Sample 2 – the same procedure was followed as in sample 1 except the latex was adjusted to a pH of 9 using ammonium hydroxide. Sample 3 – the procedure of sample 2 was followed, additionally, 1 part by weight of a non-ionic emulsifier was added to the latex. Samples 4, 5 and 6 were prepared following the procedure of Sample 1.

Part B

The latex used in Example I was admixed with a urea-formaldehyde (UF) resin (sold as Beetle 65 by American Cyanamid Co.). One part by weight of a non-ionic emulsifier was added to 80 parts dry weight of the latex and the latex then adjusted to a pH of about 8 using triethylamine. Twenty parts of the UF resin and 8 milliliters of isopropyl alcohol were mixed and then added to the latex. Viscosity measurements were determined on the latex mix composition. Results are as follows: Original, 100 centipoise (6 rpm) and 70 centipoise (60 rpm); Two days, 100 and 70 centipoise, respectively; Fifteen days, 100 and 70 centipoise; Thirty-three days, 125 and 80 centipoise; Fifty-eight days, 175 and 100 centipoise; and Ninety-two days, 350 and 150 centipoise, respectively.

The data shows that the latex/UF resin mixes are much more stable than latex/MF resin mixes. Unfortunately, urea-formaldehyde resins do not satisfactorily add to the water resistance of the cured coating made using the compositions. The coatings exhibit poor water resistance and will blush (turn milky from clear) on exposure to water. Permeability to water is high and the coated surface is not protected from water damage.

Part C

Unexpectedly, it was discovered that the use of a combination of a melamine-formaldehyde and a urea-formaldehyde thermoset resin with the reactive acrylic ester latex provides a latex mix composition having both good stability and yielding water and chemical resistant coatings after cure. The latex/MF resin/UF resin composition exhibits improved properties, allowing for the first time stable mixes of reactive acrylic ester polymer latexes containing waterreducible thermoset resins, which mix provides water and chemical resistant coatings. The following tests show the stability of the mix compositions.

|  | 1 | 2 | 3 |  |  |  |
|---|---|---|---|---|---|---|
| Latex | 80 | 80 | 80 |  |  |  |
| MF Resin | 5 | 10 | 15 |  |  |  |
| UF Resin | 15 | 10 | 5 |  |  |  |
| Isopropyl Alcohol (ml.) | 8 | 8 | 8 |  |  |  |
| Triethylamine | X | X | X |  |  |  |
| Viscosity (centipoise) |  |  |  |  |  |  |
| Spindle Velocity (rpm) | 6 | 60 | 6 | 60 | 6 | 60 |
| Original | 110 | 75 | 275 | 125 | 900 | 295 |
| 3 days | 130 | 83 | 300 | 130 | 1100 | 365 |
| 13 days | 140 | 87 | 300 | 130 | 1100 | 375 |
| 31 days | 150 | 92 | 300 | 130 | 1100 | 385 |
| 56 days | 200 | 98 | 330 | 135 | 1150 | 410 |
| 90 days | 225 | 115 | 350 | 150 | 1600 | 560 |

The mix compositions were prepared by dissolving the MF and UF resin in the isopropyl alcohol and adding the solution to the latex (whose pH had been adjusted to about 8 using the triethylamine). Additionally, 1 part by weight of non-ionic emulsifier was added to the latex. All of the latex coating compositions had a pH of about 8.

EXAMPLE II

Although the combination of a MF resin and UF resin provides increased stability in all instances over the use of an MF resin alone, the choice of amine used to adjust the pH of the latex mix composition affects the stability of the mix. The amines employed are those typically used in adjusting the pH of a latex. However, the preferred amines are those secondary or tertiary amines having alkyl or alkanol groups containing 1 to 4 carbon atoms in the group. The latex mix composition used in the following table of data were all adjusted to a pH of about 7.5 using the designated amine.

|  | 1 | 2 | 3 | 4 | 5 | 6 |
|---|---|---|---|---|---|---|
| Latex | 80 | 80 | 80 | 80 | 80 | 80 |
| MF Resin | 15 | 15 | 15 | 15 | 15 | 15 |

-continued

| | | | | | | | | | | | | |
|---|---|---|---|---|---|---|---|---|---|---|---|---|
| UF Resin | 5 | | 5 | | 5 | | 5 | | 5 | | 5 | |
| Isopropyl Alcohol (ml.) | 8 | | 8 | | 8 | | 8 | | 8 | | 8 | |
| N-methyl Pyrrolidone[a] | 2.5 | | 2.5 | | 5 | | 5 | | 5 | | 5 | |
| Hydroxyethyl Cellulose[b] | 0.2 | | 0.2 | | 0.5 | | 0.5 | | 0.5 | | 0.5 | |
| Non-ionic Emulsifier | — | | — | | 1 | | 1 | | 1 | | 1 | |
| Triethylamine | X | | | | | | | | | | | |
| Dimethylaminomethyl Propanol | | | X | | X | | | | | | | |
| Monoisopropanol Amine | | | | | | | X | | | | | |
| Diisopropanol Amine | | | | | | | | | X | | | |
| Triisopropanol Amine | | | | | | | | | | | X | |
| Viscosity (centipoise) | | | | | | | | | | | | |
| Spindle Velocity (rpm) | 6 | 60 | 6 | 60 | 6 | 60 | 6 | 60 | 6 | 60 | 6 | 60 |
| Original | 300 | 162 | 325 | 165 | 1150 | 275 | 1550 | 310 | 1450 | 290 | 1500 | 300 |
| 22 Days | 625 | 235 | 550 | 212 | — | — | — | — | — | — | — | — |
| 35 Days | — | — | — | — | 1525 | 305 | 2250 | 465 | 1625 | 320 | 1900 | 370 |
| 42 Days | 650 | 245 | — | — | — | — | — | — | — | — | — | — |
| 73 Days | — | — | — | — | 3200 | 720 | gelled | | 1800 | 360 | 2000 | 400 |
| 86 Days | 2200 | 640 | gelled | | — | | — | | — | | — | |
| 88 Days | — | — | — | — | gelled | | — | | — | | — | |
| 96 Days | gelled | | — | — | — | | — | | — | | — | |
| 196 Days | — | — | — | — | — | — | — | — | 2800 | 550 | 2100 | 420 |
| 10 Months | — | — | — | — | — | — | — | — | gelled | | 4600 | 800 |

[a]Coalescing Agent
[b]Thickener

The data shows that all of the latex compositions were stable for at least one month. The compositions prepared using diisopropanol amine and triisopropanol amine were stable (i.e. did not gel) for over six months. The composition prepared using triisopropanol amine to pH the latex was stable for over 10 months.

I claim:

1. A stable latex coating composition comprising (1) an acrylic ester polymer latex wherein the polymer having cure sites selected from the group consisting of hydroxy, carboxyl and mixtures thereof on the polymer where the hydroxyl groups result from the interpolymerization of an N-alkylol amide of an $\alpha,\beta$-olefinically unsaturated monocarboxylic acid and the carboxyl groups result from the interpolymerization of an $\alpha,\beta$-olefinically unsaturated carboxylic acid and (2) a combination of a water-reducible, thermoset melamine-formaldehyde resin and urea-formaldehyde resin, wherein the melamine-formaldehyde resin is present in about a 1:1 to about a 4:1 weight ratio to the urea-formaldehyde resin and the combination is used in from about 5 parts to about 30 parts by weight total per 100 parts by weight of polymer in the latex.

2. A composition of claim 1 wherein the acrylic ester polymer is comprised of interpolymerized units of (a) from about 9 percent to about 99 percent by weight of at least one acrylic ester monomer of the formula

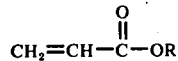

wherein R is selected from the group consisting of an alkyl group containing from 1 to about 18 carbon atoms, an alkoxyalkyl or alkylthioalkyl group containing 2 to about 8 carbon atoms, and a cyanoalkyl group containing 2 to about 8 carbon atoms, (b) up to about 90 percent by weight of a vinylidene comonomer(s) containing a terminal ($CH_2$=C<) group, and (c) from about 1 percent to about 10 percent by weight of a cure-site monomer selected from the group consisting of vinylidene monocarboxylic acids containing 3 to about 6 carbon atoms, and N-alkylol amides of $\alpha,\beta$-olefinically unsaturated monocarboxylic acids containing 4 to 10 carbon atoms.

3. A composition of claim 2 wherein the acrylic ester polymer (a) is present in amounts of from about 9 percent to about 80 percent by weight, (b) is present in amounts from about 10 percent to about 90 percent by weight, and (c) is present in amounts of from about 1 percent to about 10 percent by weight.

4. A composition of claim 3 wherein (a) the R group is an alkyl group containing 1 to about 10 carbon atoms.

5. A composition of claim 4 where the cure-site monomer in (c) is an N-alkylol amide of an $\alpha,\beta$-monolefinically unsaturated monocarboxylic acid.

6. A composition of claim 5 additionally containing a di- or trialkyl or alkanol amine wherein the alkyl or alkanol group contains 1 to 4 carbon atoms.

7. A composition of claim 6 additionally containing an acid catalyst.

8. A composition of claim 6 wherein the acrylic ester polymer is comprised of interpolymerized units of ethyl acrylate, methyl methacrylate, N-methylol acrylamide, and acrylamide.

9. A composition of claim 8 wherein the amine used is diisopropanol amine or triisopropanol amine.

* * * * *